Aug. 11, 1970 SANG Y. WHANG 3,524,023

BAND LIMITED TELEPHONE LINE DATA COMMUNICATION SYSTEM

Filed July 14, 1966 7 Sheets-Sheet 1

INVENTOR
SANG Y. WHANG
BY Browne, Schuyler & Beveridge
ATTORNEYS

INVENTOR
SANG Y. WHANG

BY Browne, Schuyler & Beveridge
ATTORNEYS

INVENTOR
SANG Y. WHANG
BY Browne, Schuyler, & Beveridge
ATTORNEYS

BAND LIMITED TELEPHONE LINE DATA COMMUNICATION SYSTEM

Filed July 14, 1966 7 Sheets-Sheet 4

INVENTOR
SANG Y. WHANG

BY Browne, Schuyler, & Beveridge
ATTORNEYS

BAND LIMITED TELEPHONE LINE DATA COMMUNICATION SYSTEM

Filed July 14, 1966 7 Sheets-Sheet 5

INVENTOR
SANG Y. WHANG
BY Browne, Schuyler, & Beveridge
ATTORNEYS

INVENTOR
SANG Y. WHANG
BY Browne, Schuyler & Beveridge
ATTORNEYS

Aug. 11, 1970 SANG Y. WHANG 3,524,023

BAND LIMITED TELEPHONE LINE DATA COMMUNICATION SYSTEM

Filed July 14, 1966 7 Sheets-Sheet 7

INVENTOR

SANG Y. WHANG

BY Browne, Schuyler, & Beveridge

ATTORNEYS

3,524,023
BAND LIMITED TELEPHONE LINE DATA COMMUNICATION SYSTEM

Sang Y. Whang, Miami, Fla., assignor to Milgo Electronic Corporation, Miami, Fla., a corporation of Florida Filed July 14, 1966, Ser. No. 565,214
Int. Cl. H04m *11/06*
U.S. Cl. 179—2 40 Claims

ABSTRACT OF THE DISCLOSURE

A data modem capable of transmitting digital data at high data rates over ordinary voice grade telephone lines is disclosed. A carrier frequency is modulated by a serial group of digital data signals to be transmitted. Narrow bandpass filtering with a linear phase network and a fixed equalizer makes all ordinary switched telephone lines appear similar as to amplitude and delay characteristics for the narrow passband employed in the disclosed modem.

This invention relates to an electronic digital data transmission system to transmit data at high speeds through ordinary unconditioned voice grade telephone lines. In particular, this invention relates to digital data transmission method and apparatus to transmit digital data at a very high bit rate through randomly selected ordinary unconditioned voice grade telephone lines.

In this specification "ordinary unconditioned voice grade telephone line" means an unequalized or uncompensated telephone circuit randomly selected by conventional telephone switching equipment. Characteristics of such lines can be found in the Bell System Technical Journal, May 1960.

"Variable equalization" means the custom upgrading of a line in its amplitude and delay characteristics by an adjustable device so that the composite characteristic of the line and whatever device is used for equalization, compensation or conditioning is constant for a wide range of frequencies.

"Relative amplitude and delay characteristics of the average of a plurality of unconditioned voice grade telephone lines within a narrow pass band" means the algebraic average relative amplitude characteristic (in decibels) and the algebraic average relative delay characteristic (in seconds) of a large number of ordinary unconditioned voice grade telephone lines within a narrow pass band, as described in the above-referenced Bell System Technical Journal.

Digital data transmission over voice grade telephone lines and circuits has been going on over ten years. Different manufacturers, using different techniques, have claimed much higher bit rates than 2400 bits per second. Generally, these high speed data transmissions require custom individually adjusted line conditioning otherwise known as line equalization to control the amplitude and delay characteristics for the frequencies used. A number of companies manufacture devices known as variable line equalizers. The device has many knobs to adjust so that the amplitude and envelope delay characteristics of the composite line and the equalizer become constant for the wide range of frequencies. With the aid of these variable equalizers, the telephone channel bandwidth can be equalized for a range as wide as 2500 Hz. bandwidth. With this bandwidth, 2400 bits per second, 3600 bits per second, or even 4800 bits per second can be transmitted.

However, variable equalizers are expensive to begin with and require a skilled operator. Even a skilled operator may take over an hour to equalize a line satisfactorily. In order to make sure that the line is well equalized, it further requires additional test equipment to check the overall characteristic after equalization. This custom equalization must be done each time the equipment is connected into a circuit or "line" selected for use at these high-bit rates.

The inconvenience of the use of variable equalizers has prevented any high speed data transmission over regular switched dial-up telephone lines. Each time one dials a number, he gets a different line combination by automatic telephone switch means. Therefore, it is impractical to spend appreciable time to equalize a line each time you transmit data.

Much recent work has been directed toward an automatic equalizer hopefully to equalize the line automatically while data is being transmitted, but no satisfactory devices are as yet available on the market. Moreover, such devices would be too expensive for a general use.

Until the present time, a data modem (modulator-demodulator) that will work over non-equalized switched telephone lines with any reliability has the maximum bit rate of 600 bits per second.

As shown above, the basic philosophy of the prior art and current development is in upgrading each telephone line individually through automatic or manually operated equalization devices each time data is to be transmitted. The basic philosophy of the present invention lies in the discovery that if the signals are appropriately band limited, as described hereinafter, all the lines appear essentially the same within that band width. Mose telephone lines do not have the desired characteristic, but, since they are approximately the same within a selected narrow bandwidth as hereinafter described, a fixed equalizer will make them suitable and essentially the same for the purpose of transmitting digital data at a high bit rate, and almost all lines will behave as a linear phase bandpass filter with a known response irrespective of variations between lines. In one respect, the invention may be thought of as adapting the signal format to accommodate an unequalized line, rather than custom adapting a line to the signal, by narrowing the signal spectrum appropriately to provide that within that bandwidth the lines all appear similar.

It is the principal object of this invention to provide a data modem which will transmit data at a high bit rate (say 2400 bits per second) over ordinary switched telephone lines of differing relative amplitude and delay characteristics without a variable equalizer, automatic or otherwise.

It is also an object of this invention to provide a method of compensation for the delay characteristics of a system of telephone lines differing from each other, including telephone line equipment variations, by neutralizing the average of many conditions within bandwidth limits bearing a desired relationship to the modulation period employed.

It is a further object of this invention to provide a method of achieving a maximum bit transmission rate for a given bandwidth of a channel.

Further objects and advantages will become apparent from the following description taken in conjunction with the figures in which.

Figure 1:
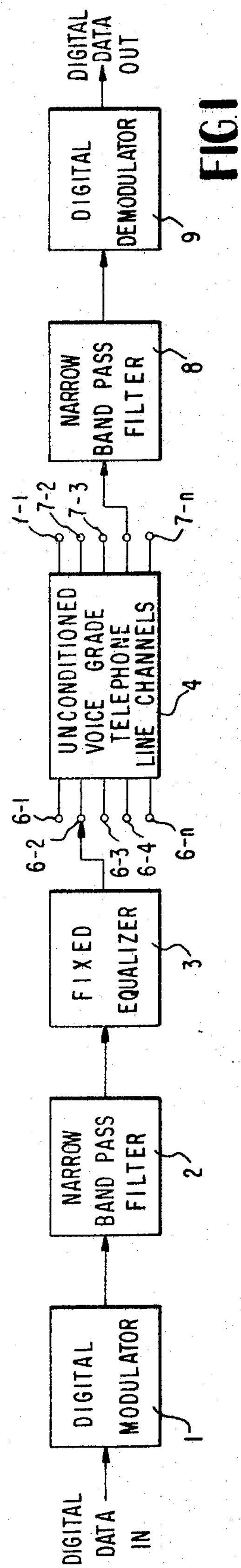
FIG. 1 is a block diagram of a digital data communication system incorporating the principles of the present invention.

The broad aspects of the invention are disclosed in the block diagram of FIG. 1. Digital data is supplied to digital modulator 1 from a source (not shown). Digital modulator 1 may be an angle modulator (for example, phase and/or frequency) or amplitude modulator under suitable restrictions. Such digitally modulated signals from modulator 1 are band-limited by narrow bandpass filter 2 and applied through fixed equalizer 3 to a fortuitously selected ordinary unconditioned voice grade telephone line, of the group designated in block 4. It will be understood that such lines include exchange, long and short haul lines, and the selected one may be from many different and diverse paths. Lines 6–1, 6–2 . . . **6–*n* may be selected, for example, by local telephone switch equipment, and one of lines 7–1, 7-2 . . . 7–*n* will be locally selected by remote telephone switching equipment for long hauls etc. Any of "lines" 6 may be connected with any of "lines" 7 to form a complete line as described herein. Each combination of "lines" and components thus produces different relative amplitude and delay characteristics for the complete line and it will be apparent that getting the same line for successive calls is purely fortuitous. At the receiving portion of the modem, the signal is preferably passed through a further narrow bandpass filter 8 to a suitable demodulator 9. The requisite narrow bandpass characteristic may be achieved by a composite of filter 2 and filter 8 at either the receiver or transmitter portion of the modem. However, it is preferred that filters 2 and 8 both be used to form a composite nework having a $1/T$ Hz. bandpass under 1000 Hz. The filter(s) are pase corrected as described later herein, so that the bandpass filters have linear phase. In addition, fixed equalizer 3 may be at the transmitter and/or receiver portions of the modem. However, it is preferred that fixed equalizer 3** be at the transmitter portion of the modem.

Figure 2:
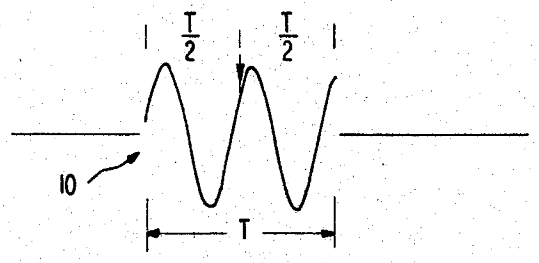
FIG. 2 illustrates a square pulse envelope modulated carrier signal with modulation period of T.

As background for better understanding of the invention consider a carrier pulse 10, T seconds long as shown in FIG. 2. This signal has carrier frequency of $f_0$ and a modulation period of T seconds. This signal might be transmitted through many different bandpass filters to determine the necessary and sufficient bandwidth to recover the response shape as shown in FIG. 3.

Figure 3:
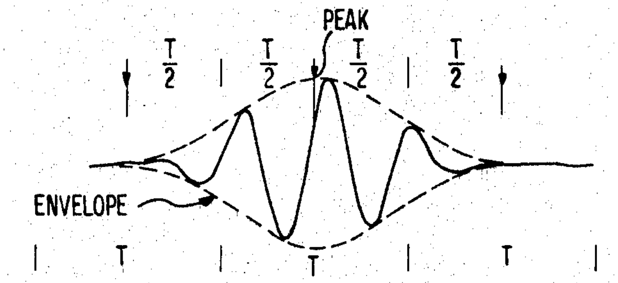
FIG. 3 illustrates a typical desired response of signal in FIG. 2 when subjected to proper band limiting filter.

The wave shape in FIG. 3 illustrates the necessary and sufficient response shape to recover all of the information and is utilized in this invention. The main feature (1) of this desired wave shape is that the envelope has its amplitude peak at the middle of the modulation period T and the amplitude of the envelope becomes zero at the middle of the adjacent modulation periods. The envelope should be symmetrical on both sides from the peak of the envelope as shown. The next feature (2) is that the frequency of the carrier within the modulation period T should be about the same as the original input carrier frequency of $f_0$ in FIG. 2. The third feature (3) is that the phase angle of the carrier sine wave at the middle of the modulation period T should be about the same as that of input signal in FIG. 2. If they are not the same, they should be different by a constant angle so that when the input phase angle is changed by 45°, for instance, the response phase at the middle of the modulation period should also be changed by the same 45°.

The result of analytical and experimental investigations reveals the following conclusions:

(1) If the signal of FIG. 2 is passed through a bandpass filter which has passband width hereinafter referred to as bandwidth of $1/T$ Hz. with its center frequency at $f_0$, the carrier frequency, and if the phase characteristic is substantially linear within the passband, the response of this filter meets all three features (requirements) of FIG. 3.

Figure 4:
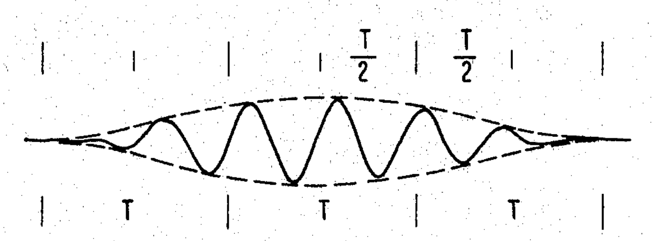
FIG. 4 illustrates a response shape when the bandwidth is too narrow.

(2) If the bandwidth of this filter is made narrower than 1/T Hz. while maintaining other characteristics, the peak of the envelope decreases and the response time stretches longer, as shown by the wave shape in FIG. 4 and the amplitude does not reach zero at the middle of the adjacent modulation period.

Figure 5:
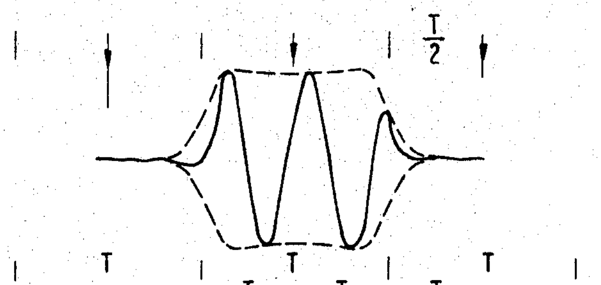
FIG. 5 illustrates a response shape with a wide bandwidth without distortion.
Figure 6:
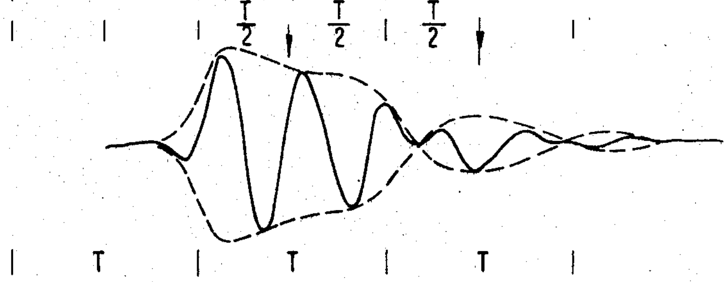
FIG. 6 illustrates a response shape with a wide bandwidth with severe delay distortion.

(3) If the bandwidth of this filter is made wider than 1/T Hz. while maintaining other characteristics, the response shape approaches the original input signal. The response of such a wide band filter is shown in FIG. 5. At the middle of the modulation period T, the response of FIG. 5 and FIG. 3 are essentially the same, and at the middle of the adjacent modulation period, the amplitude reaches zero. Because of the fact that the wider band gives a response that is close to the original signal, it is understood in the industry that the wider the bandwidth, the better the respones. A wider bandwidth would indeed be better if one could maintain amplitude and delay characteristics of the line in a proper shape for all lines. This is the reason why the industry is moving towards expensive automatic line equalizers, as mentioned before. If the amplitude and delay characterisics are not proper for the entire passband, the response becomes distorted as shown in FIG. 6. If the line characteristic is good within the bandwidth of $1/T$ Hz. and poor outside of this range, it is beter to pass only $1/T$ Hz. bandwidth and get an output shape like FIG. 3 than to pass a wider bandwidth and lose critical features of the response. As will be seen later, it is the above-mentioned three features that enable the receiver to recover the transmitted information from the signal.

Figure 7:
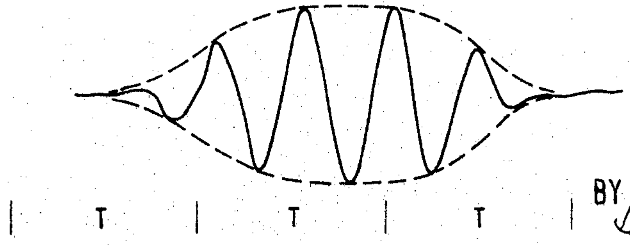
FIG. 7 illustrates the response of the proper band limiting filter with a modulation period longer than T.

(4) If we fix the filter as in case (1) and increase the modulation period of the input signal to a longer period than T, the response of the filter becomes as shown in FIG. 7. The envelope stretches longer without much increase in the amplitude, resembling the envelope shape of FIG. 5, but stretched out in time.

(5) With the same filter as case (1), of the modulation period is decreased to less than T, the output shape looks just like FIG. 3, except the amplitude of the response decreases in same proportion. For example, if the modulation period is reduced to $T/3$, the response amplitude is only ⅓ that of FIG. 3.

(6) If an impulse voltage of $T/100$ duration and amplitude of 10 times the signal level is injected into the same filter of case (1), the response shape looks like that of FIG. 3, except the amplitude is only one-tenth ($^{10}/_{100}$). This impulse could be considered as a carrier pulse of only $T/100$ duration at its peak amplitude. Since the amplitude is 10 times the case (1) signal, the response is $^{10}/_{100}$, i.e., one-tenth only. In most telephone lines, RMS noise level is rather low. The kinds of noise frequently encountered are impulse types of noise.

(7) With the same filter, the output signal amplitude is directly proportional to the input signal amplitude.

Now the application of the above will be shown in an exemplary data transmission problem. The invention will be considered with a particular bit rate of 2400 bits per second and how to transmit and receive the same through a common telephone line channel. However, the same principle and argument will hold for any other bit rate and appropriately limited bandwidth channel.

The example dealt with here is transmission of 2400 bits per second serial data through a common telephone line channel. 2400 bits per second serial binary data (strings of "1's" and "0's" like 11000100010011 etc.) are supplied together with a 2400 Hz. clock, to the data modulator. The modulator's function is to convert this information into another form of electrical signal that can be transmitted through a telephone line. The demodulator's function is to receive this transmitted signal and convert it back into its original serial binary data form at the correct rate with the minimum of bit errors.

Since the bit rate is 2400 per second, each bit lasts 417 microseconds (0.000417 sec.). In order to transmit a carrier wave with modulation period of 417 microseconds, the necessary and sufficient bandwith according to the theory as discussed above is 2400 Hz. (1/0.000417=2400).

A 2400 Hz. bandwidth is not available from a common telephone channel without the aid of a variable equalizer. With ordinary unconditioned telephone lines, any 2400 Hz. bandwidth on a common telephone line is sometimes 15 db and envelope delay variation of over 2 milliseconds, which cannot be tolerated.

Two data bits grouped into one modulation period should have a modulation period of 833 microseconds and the necessary bandwidth would be 1200 Hz. A 1200 Hz. bandwidth on a common telephone line is sometimes (best line conditions) good enough to transmit data without equalization; however, in most instances it requires equalization. The variation in line conditions for 1200 Hz. bandwidth is so great that it does nott allow the use of one fixed equalizer which enables the modem to operate over most of the lines. In other words, it still requires a variable equalizer. In its best 1200 Hz. bandwidth, the common dial-up line has amplitude variations of over 10 db and envelope delay variations of over 1 millisecond.

However, three data bits grouped into one modulation period has a modulation period of 1250 microseconds and the necessary bandwidth according to the invention herein is 800 Hz. An 800 Hz. bandwidth centered around 1700 Hz., i.e., 1300 to 2100 Hz., has good dependable characteristics. It has an average U-shaped envelope delay characteristic of only 200 microsecond variation within the passband and amplitude linearly rolling off with average slope of 5 db per 800 Hz. With a fixed equalizer whose amplitude characteristic increasing 5 db from 1300 Hz. to 2100 Hz., and whose relative envelope delay characteristic displaying an inverse (or complementary) U-shape of 200 microsecond peak, the usual unconditioned voice grade telephone lines can be made to have amplitude variation of under about 2 db and an envelope delay variation of below about 200 microseconds within the range of 1300 Hz. to 2100 Hz. Outside of this range, of course, the characteristics vary in a totally unpredictable manner. A 1250 microsecond modulated 1700 Hz. carrier as shown in FIG. 2 has an energy spectrum spanning wide frequency ranges, and if this signal is transmitted through a common telephone line, the wave shape will be distorted typically as shown in FIG. 6 even though the line may have a decent response at 800 Hz. bandwidth. It is the unnecessary components beyond this bandwidth coming through at the wrong time with irregular amplitudes which distorts the signal.

By band limiting the signal and rejecting all such unnecessary components and passing only the 800 Hz. bandwidth from 1300 Hz. to 2100 Hz., the signal shape as shown in FIG. 3 will be produced. There is precaution to observe in the band limiting process. It is not difficult to build a band pass filter with pass band of 800 Hz. centered at 1700 Hz. However, the filter in general introduces a great deal of delay distortion. It has been found that it is better to reject unnecessary signal components outside the selected narrow band as much as possible. However, increased rejection of components of signal outside the band results in more delay distortion. For example, a well-known Chebyshev 800 Hz. bandpass filter has delay variation as much as 1 millisecond. It is worse than a telephone line. However, in accordance with the invention, a fixed filter is utilized—the additional filter delay is fixed and can be equalized by adding a fixed delay correction network until the delay variation added by the filter is made as small as desired. Among the references available on the design of such bandpass filters with linear phase are: H. Nyquist, Phase Compensating Network, U.S. Pat. 1,770,422, July 15, 1930; S. Y. Whang, Electrical Filter Consisting of Frequency Discriminating Section Concatenated With All-Pass Complementary Phase Correcting Section, U.S. Pat. 3,122,716, Feb. 25, 1964; R. M. Lerner, Band-Pass Filters With Linear Phase; Proceedings of the IEEE, pp. 249–268, Mar 1964. Filter manufacturing companies have set up computer programs to design delay correcting networks for any given delay distortion in a specific line condition.

With a delay equalized bandpass filter, all the telephone channels can be made to look similar. Filters as here contemplated have smaller bandwidth than most telephone lines but have the advantage that all the lines are now very much alike within the limits of the passband, and the extra delay distortion so introduced is fixedly compensated along with fixed compensation for the average line characteristic. There are no uncertain elements in the channel, and with the fixed equalizer, as described, the lines will all produce a satisfactory response wave shape when 1250 microsecond modulated carrier pulses are transmitted through them at a carrier frequency approximately 1700 Hz.

This use of a fixed delay compensated narrow-band filter to make all the telephone lines appear approximately the same and dependable, thus to eliminate the need of a variable equalizer for high bit rates, is a unique feature of this invention.

Since, in effect, commercial telephone line channels, fortuitously dial-selected, have been made to resemble a linear phase 800 Hz. bandpass filter, a sophisticated data modem that will operate through this dependable bandpass filter at high bit rates can now be described in terms of an angle modulation system where modulation periods are related to the bandpass range.

Three data bits are grouped into one modulation period in order to narrow the required bandwidth to 800 Hz., corresponding to a transmission rate of 800 signals/sec. There are eight different combinations that three successive binary data bits can possess; namely, 000, 001, 010, 011, 100, 101, 110 and 111. This means each modulation period must reliably convey eight different messages or values of information. For example, the carrier pulse could be generated with eight different amplitudes, and each different amplitude could be assigned to each different three bit word. Since the peak of the response at the center of modification is proportional to the input amplitude, and adjacent modulation period responses are zero at the center of modulation period in question, by detecting the amplitude of the envelope at the center of a modulation period, the receiver could decode the information. The receiver would have to be lined up as to what is the peak amplitude and what amplitude step each word takes, for correct detection at the receiver of the modem. Unfortunately, telephone line amplitude is subject to unpredictable changes on a long-term as well as short-term basis. This amplitude change is bound to offset the receiver alignment and cause an erroneous decoding. For these reasons, amplitude modulation is not entirely satisfactory, and angle modulation is preferred, and is illustratively described as a differential phase modulation, although a frequency modulation can be utilized as can other forms of keyed phase modulation.

The technique used as an embodiment of this invention is a differential 8-phase modulation scheme. The eight different values of information are encoded into the eight different phase differences between each newly selected carrier phase and the phase during the previous modulation period. The carrier frequency is the same for all phases, illustrated at 1700 Hz. The eight different magnitudes of phase shift are zero and multiples of 45 degrees, as follows.

| Pattern: | Phase shift |
|---|---|
| 001 | 0° (−45°×0) |
| 000 | −45° (−45°×1) |
| 100 | −90° (−45°×2) |
| 101 | −135° (−45°×3) |
| 111 | −180° (−45°×4) |
| 110 | −225° (−45°×5) |
| 010 | −270° (−45°×6) |
| 011 | −315° (−45°×7) |

Figure 8:
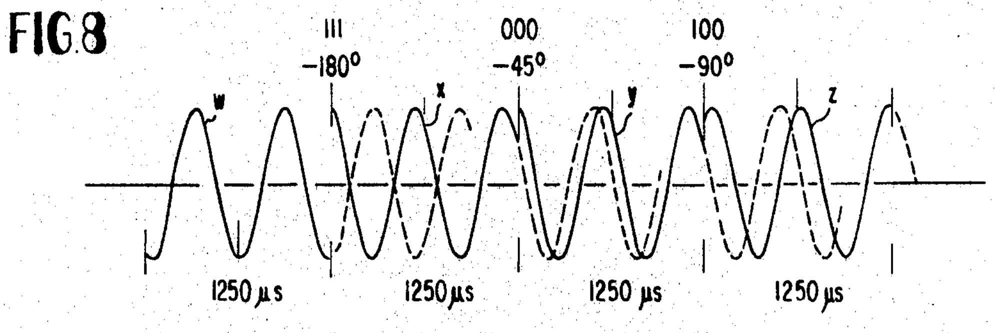
FIG. 8 illustrates a typical 8-phase encoded 1700 Hz. signal.

For example, if a serial binary data of 111 000 100 is given to the transmitter, the transmitter will generate a signal as shown in FIG. 8.

Figure 9:
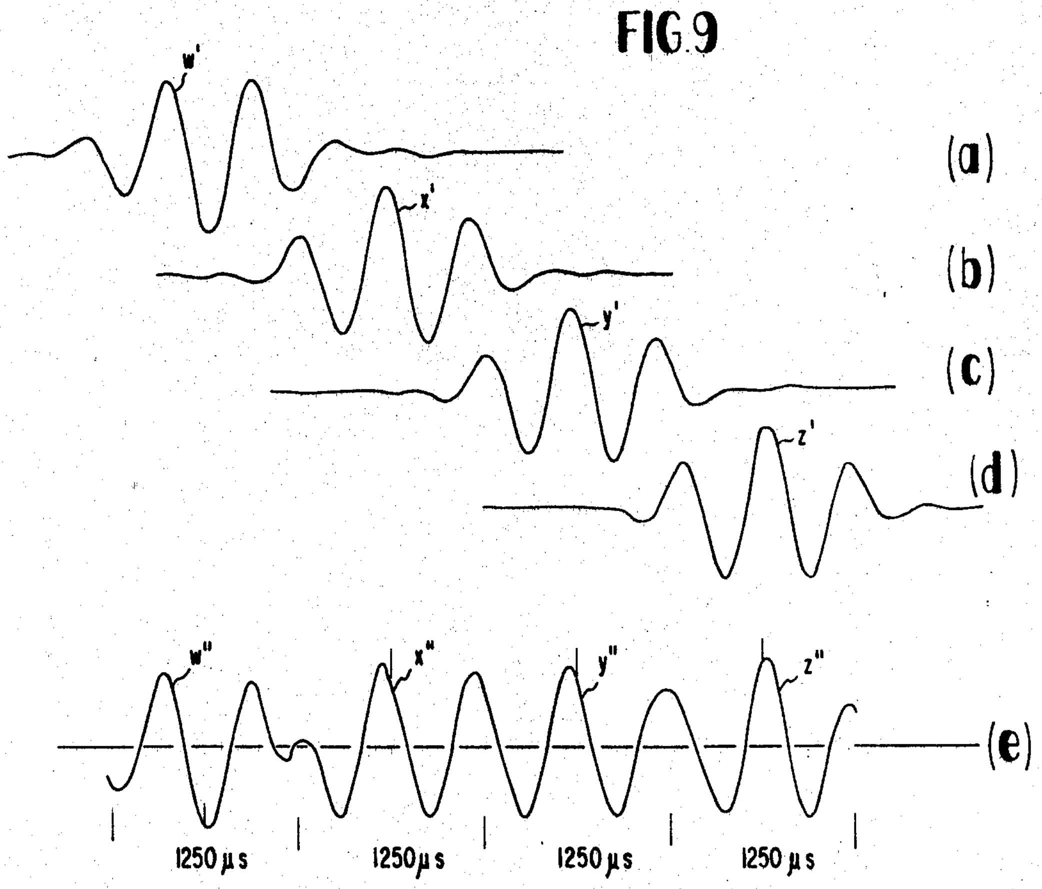
FIG. 9 illustrates the component signals for the words transmitted, according to FIG. 8 in lines (*a*)–(*d*) and the composite signal in line (*e*), through a linear phase bandpass filter whose passband is illustratively about 1300 Hz. to 2100 Hz., assuming a 1700 Hz. center frequency.

In FIG. 8, the transmitter is generating 1700 Hz. sinusoidal voltage of arbitrary phase. Upon receiving three data bits of 111, the transmitted phase of the 1700 Hz. signal is shifted −180° from that phase which was previously transmitted. Upon receiving the next three data bits of 000, the phase is further shifted by −45°. The next word, 100 shifts the phase by −90°. Since the phase shift takes place after receiving a group of three data bits, a phase shift takes place every 1250 $\mu$s. interval conventionally under control of some clock signal. The dotted line in FIG. 8 is sketched to show the effect of phase shift and represents the continuation of previous period if there were no phase shift. If the signal of FIG. 8 is subjected to band limiting, by means of filters and telephone lines, as discussed before, and if the composite band limiting networks (filter, line, fixed line equalizer, etc.) have linear phase characteristics, the response at the receiver end will look like the bottom curve (*e*) shown in FIG. 9. FIGS. 9(*a–d*) also show of what components the resultant response curve is composed. The original signal of FIG. 8 is considered as the summation of four separate modulated carrier pulses (*w, x, y, z*) each of 1250 $\mu$s. duration. The response of each carrier pulse is sketched out in FIG. 9 and they were graphically added to produce the resultant wave shape of the bottom curve (*e*). A very important fact to note in FIGS. 8 and 9 is that at the centers of each modulation period, the phase angle of the sinusoidal wave is substantially identical between the generated wave and received wave. If the phase angles are not the same, at least they will be different by the same amount and the relative phase between the adjacent periods will maintain the same relationship at the receiver end as at the generating end.

It is not difficult to understand this fact because the envelope amplitude of the two adjacent period responses reaches zero at the middle of the modulation period where the present response takes its peak amplitude. This is the reason why the features of FIG. 3, described earlier, are important.

If the response of the first received pulse modulated carrier signal has a different phase angle at the middle of the modulation period from that of the transmitted (or generated) wave, the remaining three responses will have different phase angles too. However, the difference between the transmitted (or generated) and received signals will be constant. Therefore, the all-important relative phase shift between the modulation periods will not be altered.

It is obvious from FIG. 9 that the response wave shape around the transition at the ends of the modulation periods does not resemble the generated signal. Phase information around the transition time is meaningless. As a matter of fact, the phase information integrity of the received signal is maintained only around the middle third of the modulation period.

If the received signal looked like FIG. 5 rather than FIG. 3, the phase information of the received signal will be maintained over a much wider portion of the modulation period. However, that would require a variable equalizer separately adjusted for all phone lines as discussed before. If the bandwidth is made very wide and the line is well equalized for the wide band, the signal will have essentially constant amplitude characteristics closely resembling the original generated signal. Such a wide band system is subject to the previously mentioned difficulty of equalization by means of variable equalizers.

The received signal of FIG. 9(*e*) does not have constant amplitude. This is caused by band limiting. Careful examination of the FIG. 9 reveals that the amplitude of the signal at the transitions is in general lower than the amplitude of the signal at the middle of the period. When there is a 180° phase shift, the amplitude at the transition reaches almost zero. The envelope of the received signal contains strong 800 Hz. energy that is synchronized with the modulation rate of the transmitter. In accordance with a further feature of the invention, this 800 Hz. energy is used to synchronize the receiver clock which tells the receiver when to detect phase of the incoming signal.

Band limiting in accordance with the invention not only makes all lines similar and dependable but also provides synchronized clock information at the receiver. One might say that the middle of the modulation period provides data information while the transition of the period provides clock information. This 800 Hz. receiver clock is used to derive a 2400 Hz. clock to send out data at the 2400 bit rate. While differential 8-phase data modem is not a new art, the prior art has generally sought and used a wide band channel in an attempt to make the received signals closely resemble the transmitted signals. Such detection schemes depend upon the longer phase information integrity period and use very complicated ways to maintain synchronized clock at the receiver.

Figure 10:
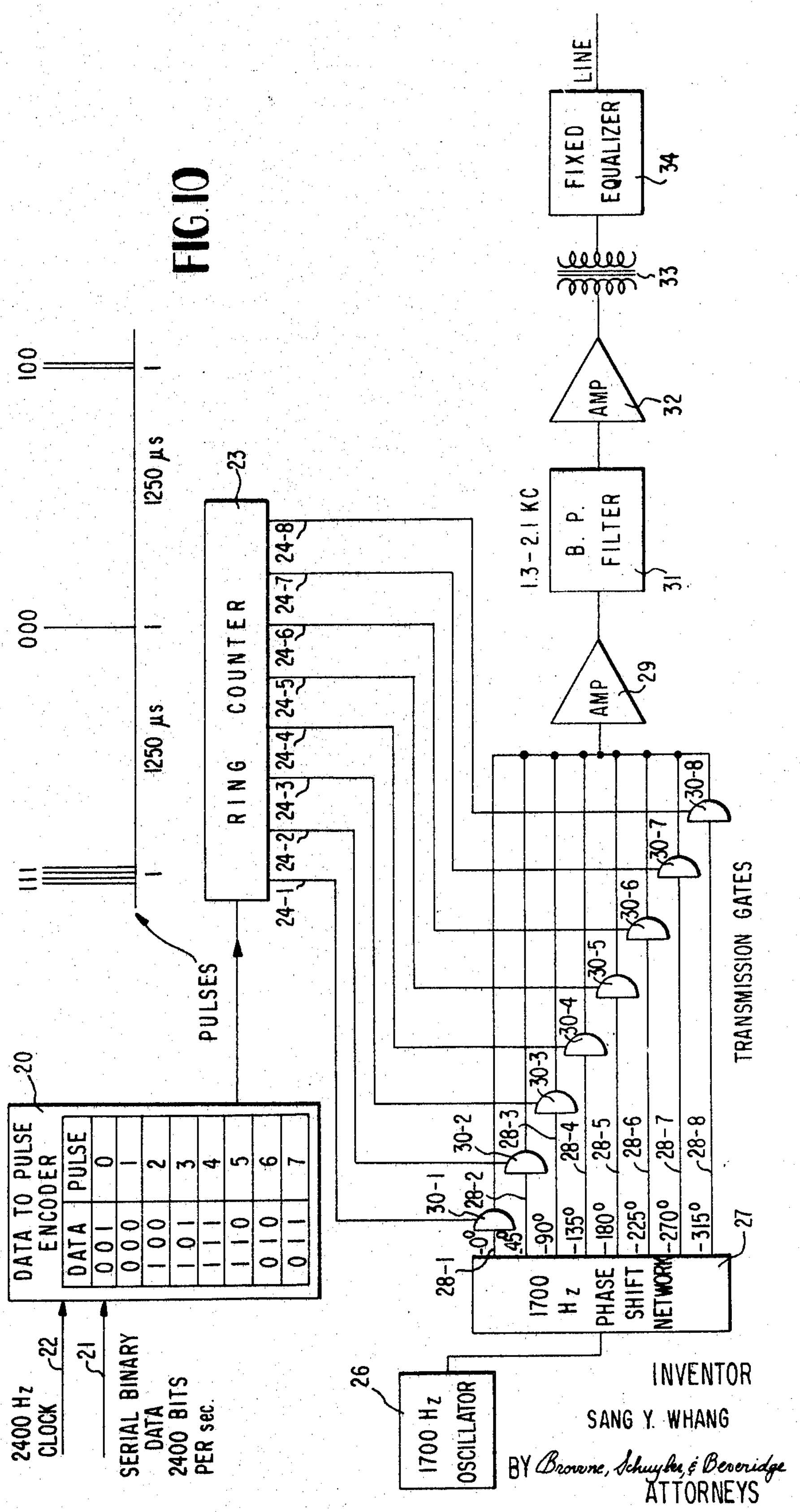
FIG. 10 is a block diagram of a transmitter suitable for use in the invention.

Now let us look into typical circuits which will perform the functions discussed above. FIG. 10 is a block diagram of the transmitter or modulator. Serial binary data at 2400 bits per second and a 2400 Hz. clock is applied to "Data to Pulse Encoder" 20 via lines 21 and 22, respectively. Encoder 20 examines the incoming serial data as a group of three bits. As described later in connection with FIG. 14, three counts of the incoming clock on line 22 tells encoder 20 to examine three bits of data that are received (or stored) in that three counts. The encoder 20 sends out groups of high frequency pulses every 1250 $\mu$s. intervals in which the number of pulses in a group depends upon the three bit data word as shown by the table inside the encoder 20. Thus, when the data word is 111 there will be four (4) pulses from encoder 20, and when the data word is 000, there will be one (1) pulse from encoder 20. The groups of pulses are 1250 $\mu$s. apart because that is how long it takes encoder 20 to receive three data bits at the assumed bit rate.

This series of groups of pulses is sent to a "ring counter" 23. The ring counter has 8 outputs, 24–1, 24–2, 24–3, etc. At any instant of time, one and only one of these outputs is in the "on" state and all the rest of them are in the "off" state. Pulses coming into this ring counter progressively shift the position of the "on" output. One pulse shifts one position, two pulses shift two positions, etc. For example, if the output 24–6 is currently "on," upon receiving four pulses (data word 111) the "on" output will shift through 24–7, 24–8, 24–1 to 24–2 and hold at the 24–2 position until the next group of pulses is received. As illustrated, after the 24–8 position, it shifts to 24–1. Since the pulse shifts occupy a very small portion of the modulation period (as shown in FIG. 10) and since they always come at a phase transition time, any additional phase signals gated through during such pulse shifts have a negligible effect. This is the well-known property of a ring counter.

In FIG. 10, a "1700 $H_z$ oscillator" 26 sends 1700 cycle sinusoidal signal to a "Phase Shift Network" 27, which has eight sinusoidal outputs on lines 28–1, 28–2, 28–3, etc. All eight outputs send out continuous equal amplitude 1700 $H_z$ sinusoidal signals, at different phase angles separated by 45° increments. These eight sinusoidal signals are connected to "Amplifier" 29 through eight individual "Transmission Gates" 30–1, 30–2, 30–3, et seq., respectively. These gates are switched "on" and "off" (e.g., "open" or "closed") by the outputs of ring counter 23. Since one and only one output of the ring counter is in the "on" state, one and only one transmission gate 30 is gated "on"; therefore, one and only one sinusoidal signal at a time is connected to the amplifier 29.

The gates 30 shift according to the number of pulses every 1250 μs. period. Since each sinusoidal output is phase-separated by 45° from its neighbor, the number of shifts represents multiples of 45° shift. Thus, the desired degree of phase shift between two adjacent modulation periods is achieved as a function of the three bit data word received on line 21.

Figure 14:
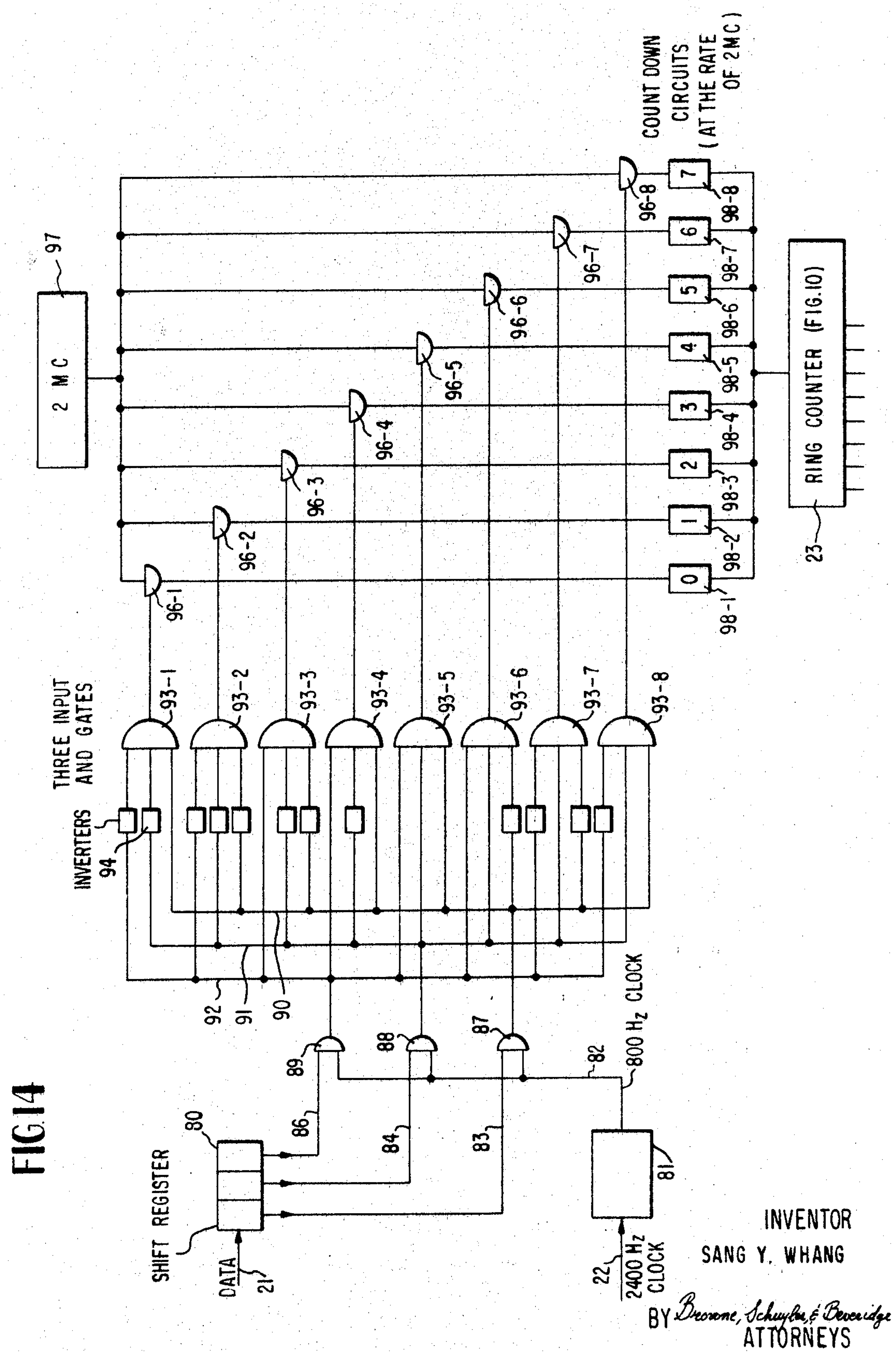
FIG. 14 is a detail diagram of the data-to-pulse encoder shown in FIG. 10.

The data-to-pulse encoder 20 is shown in FIG. 14 and comprises a three-stage shift register 80 into which the serial binary data bits on line 21 are fed at the 2400 bits per second rate, each binary bit stepping the register to the right. The 2400 $H_z$ clock is divided by three in counter or divider circuit 81 so that there will be an output on line 82 on every third clock pulse, thus providing an 800 $K_z$ clock on line 82. The three outputs on lines 83, 84 and 86 of register 80 are applied to AND gates 87, 88, 89, respectively, along with the 800 $H_z$ clock on line 82 so that each successive group of three binary bits received during every triple count of the 2400 $H_z$ clock are simultaneously applied to lines 90, 91 and 92. As noted earlier, there are eight different combinations or patterns that groups of three binary bits can assume. While lines 90, 91 and 92 apply the binary data to the inputs of eight three-input AND gates 93–1, 93–2, 93–3, 93–4, 93–5, 93–6, 93–7 and 93–8, only one such gate is opened at a time and the gate which is opened is determined by the particular pattern of three binary bits on lines 90, 91 and 92. This is accomplished by using inverters 94 which invert a binary "0" to a binary "1," and vice versa. Inverters 94 are inserted between lines 90, 91 and 92 and each gate 93 in patterns respectively corresponding to the eight possible combinations that three binary data bits can assume.

The output of each gate 93 is applied to gates 96–1, 96–2, 96–3, 96–4, 96–5, 96–6, 96–7 and 96–8, respectively. The second input to each gate 96 is supplied from a 2 $mH_z$ source 97. A series of count-down circuits 98–1, 98–2, 98–3, 98–4, 98–5, 98–6, 98–7 and 98–8 (which count at the 2 $mH_z$ rate) are connected to gates 96–1, 96–2, 96–3, 96–4, 96–5, 96–6, 96–7 and 96–8, respectively. When any of gates 96 is opened, as when as inverter 94-gate 93 circuit passes a three bit pattern, it is designed to accept, the particular counter 98 connected to the open gate begins to count down at the aforesaid 2 $mH_z$ rate and deliver the number of pulses it is designed to count off to ring counter 23 which in its turn opens one of gates 30 to send the proper phase by selection of the desired phase shifted output from oscillator 26. The number of pulses delivered to ring counter 23 by any individual count-down circuit 98 is set in accordance with the table shown in FIG. 10.

As an example, if the three binary bits in register 80 are 000, on opening gates 87, 88, 89 by the 800 $H_z$ clock, lines 90, 91 and 92 all have "0's" on them. AND gates 93 require like binary bits of "1's," and since the inverters 94 invert all bits, the three inverters 94 in the input to gate 93–2 convert the three "0's" to three "1's" so that gate 93–2 is opened to apply its output to gate 96–2. Only gate 93–2 of the gates 93 has the required inverter arrangement which opens the gate. Gate 96–2 is thus opened to allow the 2 $mH_z$ signal to reach count-down circuit 98–2, which then counts "1" (number) so that one pulse is applied to ring counter 23 which, in turn, shifts one position and holds to effect sending a −45° phase shift which is the assigned phase shift for the 000 pattern.

The signal at the input point of amplifier 29, FIG. 10, will look like the signal in FIG. 8.

This signal is band limited by the "Bandpass Fllter" 31, amplified by "Amplifier" 32 and may be coupled onto the line by a conventional coupler 33. Commercial lines, as discussed before, are very much similar when band limited within 1300 $H_z$ to 2100 $H_z$. They have amplitude roll off at about 5 db average and have U-shaped delay characteristics with average variation of 200 microseconds as shown in The Bell System Technical Journal, above noted. Fixed line equalizer 34 shown in FIG. 10 is made to have relative amplitude and relay characteristic, complementary to the relative amplitude and delay characteristics of the average line within 1300 and 2100 $H_z$ range.

This fixed equalizer 34 may be put at the end of the line instead of the beginning of the line. Its purpose is to flatten the amplitude and delay characteristics of the line. It may be noted that variable equalizers are usually put at the receiver end because an operator turns the knobs until the receiver works. The fixed equalizer used here is a passive network which means that it attenuates the signal but does not amplify. If fixed equalizer 34 is used at the receiver end, the actual signal the receiver receives is lower in power than the actual signal transmitted through the line because the equalizer dissipates some power.

However, if the fixed equalizer 34 is placed at the transmitting end of the line, for the same net power going to the receiver, power on the line is less because the excess that was going to be dissipated by the equalizer never gets on the line to begin with.

In order to minimize cross-talk on the phone lines, maximum power allowed on the line is usually limited. Elimination of excess power at the transmitting end will enable transmission of more useful power. One might call this use of a fixed equalizer at the transmitting end as a technique of predistortion or preemphasis to counteract the distortion of the line.

Figure 11:
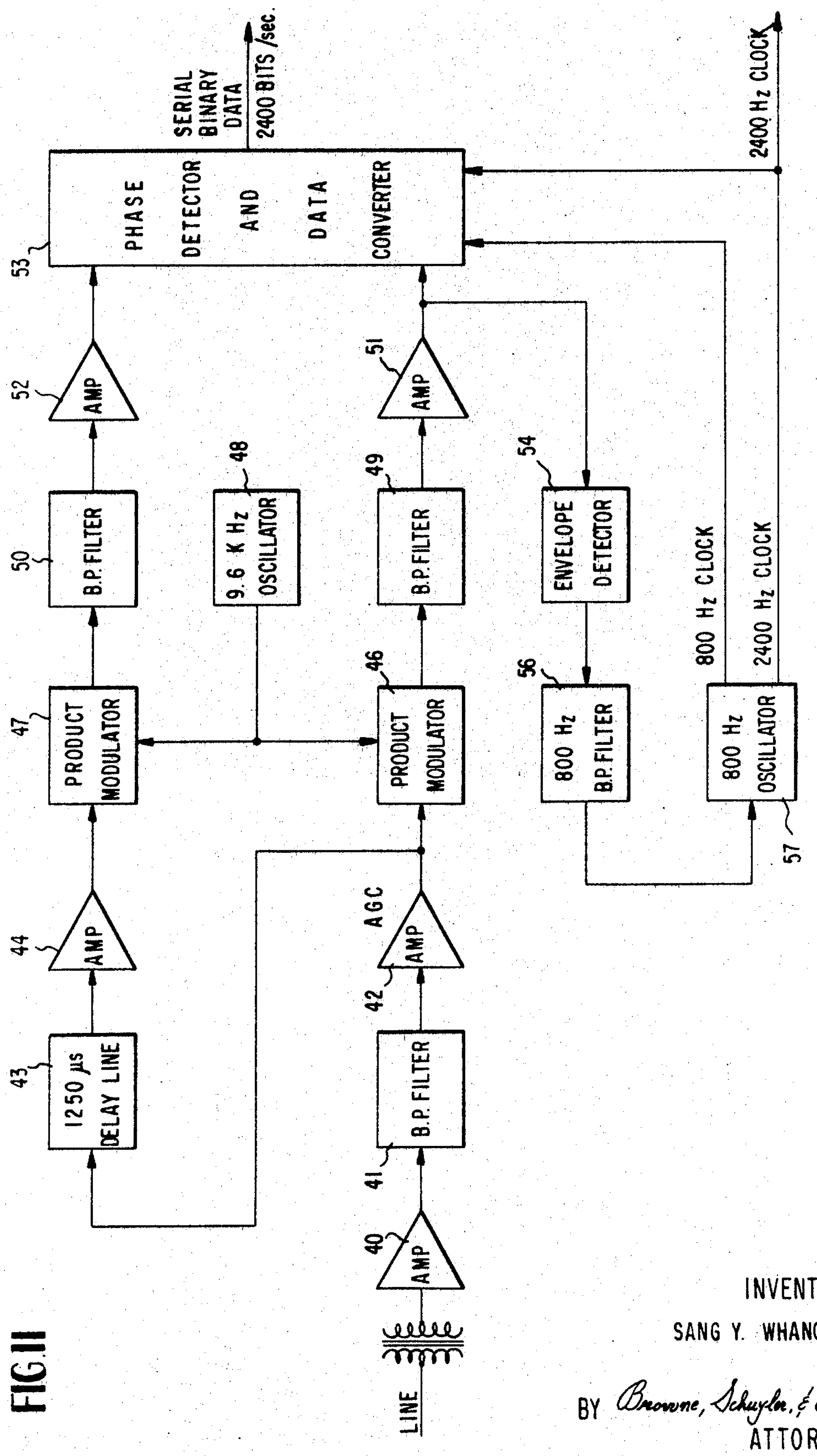
FIG. 11 is a block diagram of a receiver suitable for use in the invention.

FIG. 11 is a block diagram of a suitable receiver or demodulator. In the receiver, incoming line signal is coupled to "Amplifier" 40, is amplified thereby and filtered through "Bandpass Filter" 41 to reject line noise. Common types of line noises are 60 Hz., 120 Hz., 400 Hz. power source noises as well as impulse noise. The effect of a narrow band bandpass filter on an impulse noise is discussed earlier herein. It stretches the impulse response time longer, but the amplitude becomes significantly small so as not to interfere with the detection scheme. In wider band filters the impulse response is much greater in amplitude.

After the noise is filtered out, the signal is amplified by an "AGC Amplifier" 42 which will maintain the signal level at the output thereof substantially constant.

The signal shape at the output of amplifier 42 will look similar to the wave shape shown in FIG. 9(*e*). Since the signal has an essentially constant peak around the middle of the modulation period, a peak regulating AGC (Automatic Gain Control) amplifier having a long time constant will be sufficient. Since the information is not carried by relative amplitude but by relative phase, amplitude variation of the order of two to one or three to one does not affect demodulation. AGC amplifier 42 is used so that the amplitude of the signal to be processed comes generally within the area of the design value.

Telephone line attenuation changes from line to line and even on one line it changes from time to time. From line to line and considering all times, the amplitude of the received signal can vary as much as 30 db for one fixed transmission level. An AGC amplifier with a dynamic range of about 40 db should take care of all lines at all times.

Output from the amplifier 42 is sent through a "1250 μs. Delay Line" 43 and amplified by "Amplifier" 44. Amplifier 44 compensates for the loss in the delay line 43 so that the signal level at the output of the amplifier 44 is about the same as that of amplifier 42. Since the output of the amplifier 44 is identical with the output of the amplifier 42 except the output of amplifier 44 is delayed exactly one modulation period (1250 μs.), comparison of the phase angle between these two signals at the middle of the modulation period will reveal relative phase between adjacent periods. This information can be used to decode the original data.

However, a 1700 Hz. signal in 150 μs. means only about 2 cycles of signal per period and furthermore, as pointed out earlier, the phase integrity is maintained only in the middle third of the period; therefore, there is less than one cycle of sinusoidal signal to compare the phase. In order to avoid this situation, two signals are shifted high (e.g., up translated) into the 10.9 to 11.7 kHz. frequency range by multiplying with 9.6 kHz. signal, preserving phase integrity. Thus, there are more available cycles to compare the phase. Accordingly, "Product Modulators" 46 and 47 are supplied with the outputs of amplifiers 42 and 44, respectively, and are additionally supplied with a 9.6 kHz. signal from oscillator 48. The Product Modulators give two sidebands; however, the bandpass filters 49 and 50 following product modulators 46 and 47, respectively, select the upper sideband.

If the signals are multiplied and filtered properly without distortion, the signal at the lower frequency and the resultant signal at the higher frequency have the same envelope shapes. The higher frequency will naturally have more cycles of carrier within the modulation period. The carrier relative phase relationship between adjacent modulation periods at the higher frequency is the same as that of lower original frequency.

The proof of the above paragraph is carried out mathematically as follows:

PROOF $$\text{Orginal signal}=\underbrace{[1+m\cos(W_mt+\theta_m)]}_{\text{ENVELOPE}}\times\underbrace{\cos(W_ct+\overset{\downarrow}{\theta_c})}_{\text{CARRIER}}$$

$$=\cos(W_ct+\theta_c)+\frac{m}{2}\cos[(W_c+W_m)t+\theta_c+\theta_m]$$

$$+\frac{m}{2}\cos[(W_c-W_m)t+\theta_c-\theta_m]$$

where $\theta_c$ is the variable and can assume —45°, —135°, etc. If we multiply the original signal by cos $(Wpt+\theta p)$ and filter out any frequency component below W$p$, the result is as follows:

$$\left\{\text{COS}\ (Wct+\theta c)+\frac{m}{2}\ \text{COS}\ [(Wc+Wm)t+\theta_c+\theta_m]\right.$$

$$\left.+\frac{m}{2}\ \text{COS}\ [(W_c-W_m)t+\theta_c-\theta_m]\right\}\times\text{COS}\ (Wpt+\theta p)$$

$$=\frac{1}{2}\ \text{COS}\ [(Wp+Wc)t+\theta_p+\theta_c]+\frac{1}{2}\ \text{COS}$$

$$+\frac{m}{4}\ \text{COS}\ [(W_p+W_c+W_m)t+\theta_p+\theta_c+\theta_m]+\frac{m}{4}\ \text{COS}$$

$$+\frac{m}{4}\ \text{COS}\ [\underbrace{(W_p+W_c-W_m)t+\theta_p+\theta_c-\theta_m}_{\text{UPPER SIDEBAND}}]+\frac{m}{4}\ \text{COS}$$

The upper sideband can be arranged as follows:

$$\frac{1}{2}\underbrace{[1+m\cos(W_mt+\theta_m)]}_{\text{ENVELOPE}}\times\underbrace{[\cos\{(W_p+W_c)t+\theta_p+\overset{\downarrow}{\theta_c}\}]}_{\text{CARRIER}}$$

The envelope is identical with the original signal and the carrier frequency is the sum of the original carrier frequency and the multiplying frequency. The varying phase, $\theta_c$, appears as the phase variation of the new composite carrier. That is, if $\theta_c$ is varied by 135° at the original frequency, the higher carrier will also change 135°.

Translation of frequency from one to the other to make the detection easy is not a new art. One important thing to note is that the upper side band bandpass filters 49 and 50 must have flat amplitude characteristics and linear phase characteristics within the bandwidth of 10.9 to 11.7 kHz. which corresponds to 1.3 to 2.1 kHz. in the original frequency band. Not only should the phase characteristics of these two filters be linear but they must be identical so that the relative phase introduced by these filters is negligible. If they are off by a constant amount at all frequency ranges of interest, this constant angle must be taken into consideration when phase comparison of the two output signals are made to decode the original three bit data words.

The output of the bandpass filters 49 and 50 are amplified by amplifiers 51 and 52, respectively, and sent to the "Phase Detector and Data Converter" 53 (shown in detail in FIG. 12) to decode the phase information into binary data.

Figure 12:
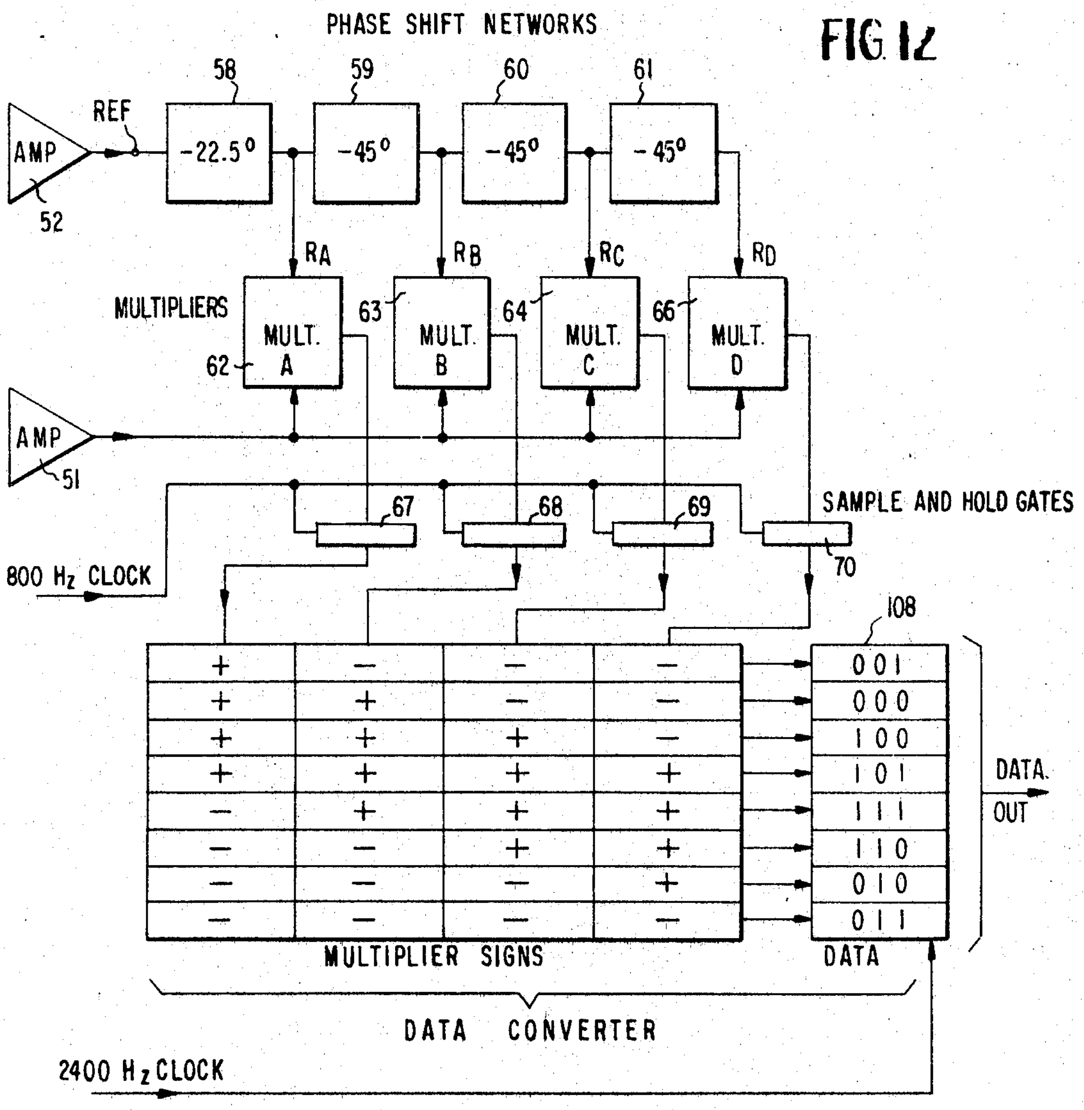
FIG. 12 is a detail block diagram of a phase detector and data converter suitable for use in the invention.

A block diagram of the "Phase Detector and Data Converter" 53 is shown in FIG. 12. However, in order to phase detect or convert these signals into data, a clock is needed which tells us when to compare the phase and at what rate to transmit binary data out, etc. As was mentioned before, the timing information from which the clock is derived is carried by the envelope of the signal.

Since the envelope is easier to detect when there are more cycles under the envelope, envelope detection is done with one of the output signals at the higher frequency instead of the line frequency.

In FIG. 11, the output of amplifier 51 is envelope detected (full wave rectified) by envelope detector 54 and passed through an 800 Hz. center frequency narrow band bandpass filter 56. The output of the bandpass filter 56 is an 800 Hz. sinusoid whose amplitude may not be constant but the frequency will be synchronized with the modulation rate of 800 Hz. Different lines have different absolute delays; therefore, the information will be reaching the receiver at a different timing. Once the timing is established, it will keep the same 800 Hz. rate. Since the 800 Hz. output of bandpass filter 56 is derived from the incoming signal, the phase relationship of this 800 Hz. signal with respect to the middle of the modulation period will be fixed regardless of the absolute delay of the line. This 800 Hz. signal from bandpass filter 56 is fed into an 800 Hz. oscillator 57 to synchronize it with the transmitter modulation rate. In the absence of the signal, this 800 Hz. oscillator will be free-running at the 800 Hz. rate. The oscillator can be made as stable as desired so that when the signal is interrupted for some time, the oscillator will remain substantially in phase with the transmitter clock. The longer one has to remain in phase in the absence of signal, the more expensive the unit will be. This assumes, of course, that the transmitter clock is at least equally stable.

Oscillator 57 provides two clocks: one at the rate of 800 Hz. and the other at the rate of 2400 Hz. These two clocks together with the output signals from amplifiers 51 and 52 are sent to a phase detector and data converter 53.

Figure 13:
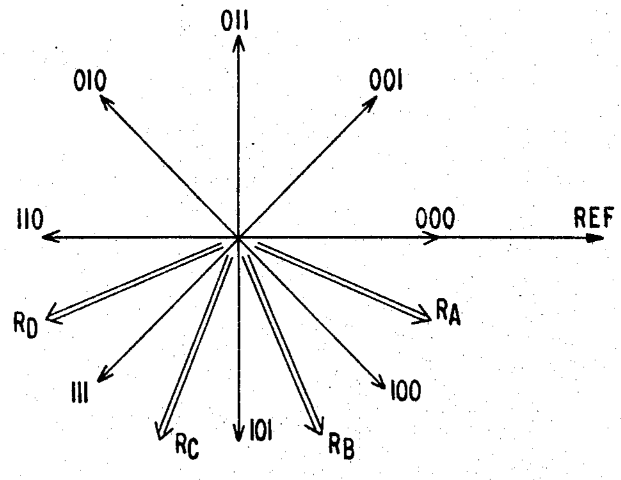
FIG. 13 is a phasor diagram of four generated reference signals of FIG. 12 and eight possible signals being detected for decoding.

FIG. 12 is the block diagram of a suitable phase detector and data converter. In FIG. 12, the signal from the amplifier 52 is phase shifted four times by phase-shift networks 58, 59, 60 and 61. The first shift is —22.5° and the next three shifts are —45°, each relative to the input phase thereto. This phase shift angle is at 11.3 KHz. which is 1.7 KHz. plus 9.6 KHz. In comparing the phase, output of the amplifier 52 is considered as the reference signal because this signal is the one delayed 1250 microseconds and among the two signals at hand, this signal represents the previous period signal. From this reference signal, four other sub-reference signals $R_A$, $R_B$, $R_C$, and $R_D$ are derived by the four-phase shift networks 58, 59 60 and 61 discussed above. A phasor diagram of these four sub-reference signals is shown in FIG. 13, sub-reference signals $R_A$, $R_B$, $R_C$, and $R_D$ being represented by double line arrows.

Incoming signals from amplifier 51 (present period signal) are multiplied by these four sub-reference signals in multipliers 62, 63, 64 and 66, respectively. Consider first the relative phase of the signal from amplifier 51 with respect to the reference signal of amplifier 52. The easiest case to consider is where there is no phase shift in the carrier at all. If 001001001 . . . in binary data had been repeated, the line signal would be a 1700 Hz sine wave without any phase shift at all. This signal, after being multiplied by 9.6 kHz. signal, is simply an 11.3 kHz. steady sinusoid. Output signals from amplifiers 51 and 52, therefore, are 11.3 kHz. sinusoidal signal except the signal from amplifier 52 is delayed by 1250 microseconds. It takes 14 cycles plus 45° to reach 1250 microseconds with 11.3 kHz. signals; therefore, with reference to the 1250-microsecond delayed 11.3 kHz. signal, the non-delayed signal will look like the same signal with a +45° advanced phase angle.

This means that if the three bit binary word was 001, the output of the amplifier 51 has a phase angle of +45° with respect to the reference. From the encoding chart in FIG. 10, word 000 is 45° less (minus) the 001; therefore, for the word 000, the present signal will be in phase with the reference signal (45−45=0). All eight different words and their phase angle with respect to reference signals are shown in FIG. 13 by eight single line arrows with proper identification.

Four multipliers 62, 63, 64 and 66 (A, B, C, and D) are designed to multiply two sinusoidal signals of the same frequency and produce as an output the average DC value. A conventional product modulator with its output passed through a low pass filter performs this function.

The average value of the product of two same frequency sinusoidal signals is proportional to the cosine of the relative difference angle.

$$A \sin(wt+\theta)\times A\sin(wt+\beta) = \underbrace{\frac{A^2}{2}\cos(\theta-\beta)}_{\text{Average Value}} - \frac{A^2}{2}\cos(2wt+\theta+\beta)$$

This means that the outputs of the multiplers are positive if the magnitude of relative angle between the two multiplier inputs is less than 90°, and negative if larger than 90°.

From the phasor diagram of FIG. 13, it is obvious that the output of the multiplier 62(*a*) is posiitve for the words 000, 001, 100 and 101; and negative for the words of 111, 110, 010 and 011.

In a similar manner the signs of the other multipliers are determined and are tabulated in FIG. 12. Detection of the signs of the four multipliers 62, 63, 64 and 66 determines the binary words. Since the phase relationships are correct at the middle portion of the modulation period, the properly phased 800 Hz. clock gates "on" the four sampling gates 67, 68, 69 and 70 for a short time duration only at the middle of each modulation period, so as to sample and hold the signs of multipliers 62, 63, 64 and 66. Once the proper three bit word is selected, bits are transmitted out one bit at a time in a proper order and with proper period by the aid of the transmitter synchronized 2400 Hz. clock.

Figure 15:
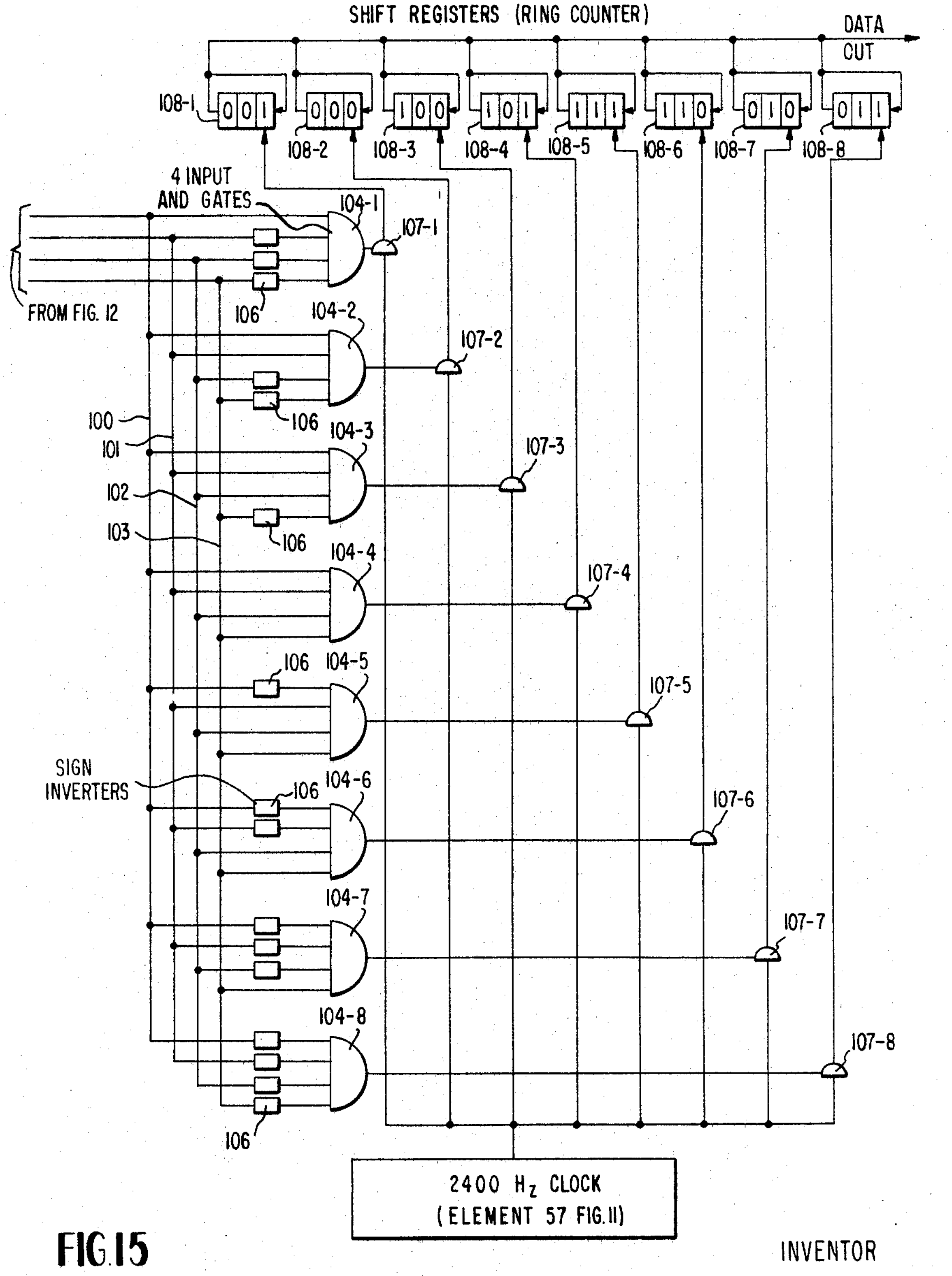
FIG. 15 is a detail diagram of the data converter shown in FIG. 12.

A suitable data converter called for in FIG. 12 is shown in detail in FIG. 15. Its purpose is to reassemble the data in the form and at the rate originally supplied to the transmitter. As noted earlier the detection of the signs of the outputs of multipliers 62, 63, 64 and 66 determines the received binary word, group, or pattern. As shown in FIG. 12, sampling gates 67, 68, 69 and 70 sample the outputs of multipliers 62, 63, 64 and 66 at an 800 Hz. clock rate. Thus, the outputs of multipliers 62, 63, 64 and 66 are simultaneously applied to lines 100, 101, 102 and 103. Eight, four-input AND gates 104–1, 104–2, 104–3, 104–4, 104–5, 104–6, 104–7 and 104–8 are provided, and the four inputs of each such gate are connected to lines 100, 101, 102 and 103, respectively. However, in accordance with the schedule set out in the table of multiplier signs of FIG. 12, a sign inverter 106 is provided in certain of the inputs to gates 104. For example, an inverter 106 is in the second, third and fourth inputs to gate 104–1 so that when the sign of multiplier A is plus and the signs of multipliers B, C and D are minus, the latter are inverted to pluses and gate 104–1 is opened. Only one gate 104 is opened at a time. The sampling gates 67–70 sample and hold the polarity until the next sampling signal is given, so that the AND gates 107 are "on" for 1250 μs.

Gates 104–1, 104–2, 104–3, 104–4, 104–5, 104–6, 104–7 and 104–8 supply an input to AND gates 107–1, 107–2, 107–3, 107–4, 107–5, 107–6, 107–7 and 107–8, respectively. The second input to gates 107 is a 2400 Hz. clock (from oscillator 57, FIG. 11) which is passed by gates 107–1, 107–2, 107–3, 107–4, 107–5, 107–6, 107–7 and 107–8 to a series of eight shift registers 108–1, 108–2, 108–3, 108–4, 108–5, 108–6, 108–7 and 108–8 (which may be coded output ring counters). Each shift register 108 is set up to deliver three bit groups, with the bit pattern of each corresponding to one possible bit pattern of the eight possible patterns. Thus, when the signs of the outputs of multipliers A, B, C and D are plus, minus, minus and minus, respectively, gate 107–1 is opened to pass the 2400 Hz. clock to register 108–1 which steps appropriately to feed out the 001 data pattern to a utilization device (not shown). In this way, the train of serial binary data fed into the transmitter is reconstructed at the receiver in the original serial order thereof.

There are several interesting features and advantages to note in this modem. The eight three-bit binary words are arranged in such a manner that the words between the adjacent phases are different by only one bit out of three bits. In the presence of noise, if the receiver were to make an error by going over the 22.5° threshold, only one out of three bits will be erroneous; not all three or two out of three. This helps minimize bit error.

Telephone lines sometimes have frequency translation. The threshold of this phase detection is 22.5°; therefore, the frequency translation should not cause an apparent phase shift of more than 22.5° within 1250 microseconds. 22.5° in 1250 microseconds is equivalent to 50 Hz. translation.

$$\frac{22.5^\circ}{1250\times10^{-6}\text{ sec.}}\times\frac{1\text{ cycle}}{360^\circ}=\frac{50\text{ cycles}}{\text{sec.}}$$

Theoretically, the equipment can take frequency translation of up to 50 Hz. The maximum frequency translation ever encountered in the ordinary phone line is 10 Hz.; therefore, it is not considered a problem for this modem.

Since the decoding is done by detecting the sign of the output of the multipliers A, B, C and D after multiplying two signals, the magnitude of the signal variation due to line condition changing does not hinder the accuracy of the decoding.

The selection of line frequency 1700 Hz. is motivated by the best range of phone line usage. Line signal frequency has no synchronous relationship with the bit rate or the way the signal is generated.

Dependable 1000 Hz. bandwidth in U.S. telephone lines is from about 1200 Hz. to 2200 Hz. Therefore, the 800 Hz. bandwidth for 1250 μs. modulation period could be from 1200 Hz. to 2000 Hz. or 1400 Hz. to 2200 Hz. with center frequencies of 1600 Hz. or 1800 Hz., respectively.

In some other countries, the dependable bandwidth may be slightly higher or lower; however, the invention contemplates securing the most dependable bandwidth of 800

Hz. for a 1250 μs. modulated period signal from the available characteristics of lines over which the data is likely to be transmitted. The invention also contemplates selection of other than 800 Hz. bandwidth if the modulation period is other than 1250 μs. The bandwidth in Hz. is numerically approximate to the inverse of the modulation period in seconds.

In FIG. 8, the generation of a phase-shifted signal is done directly at 1700 Hz. frequency. However, if one chooses to generate the phase-shifted signal at some convenient higher frequency, one may do so and simply translate down to 1700 Hz. for phone line transmission using a process similar to the receiver frequency shifting process, making sure the filters used for the process do not introduce distortion.

In FIGS. 10 and 11, there are three filters 31, 41, and 49, together with the line and the fixed equalizer, between the generated signal and the final signal whose phase is to be examined. All of these have their amplitude characteristics and delay characteristics and they all add up. It is the total composite amplitude and delay characteristic that is important in delivering proper carrier pulse response.

The requirement of band limiting with linear phase applies to this total composite amplitude and phase characteristic. This means that if any one of the filters is poorly designed, the entire system suffers. This also means that if filter 31 has poor characteristics, filter 41 could be designed to have complementary characteristics to compensate the filter 31 and vice versa.

Filter 49 has different frequency than filters 31 and 41. However, the constant shift of 9.6 kHz. by product modulation makes the 1.3 kHz. point correspond to the 10.9 kHz. point, the 1.7 kHz. point to the 11.3 kHz. point, etc. Therefore, when adding the characteristics to get the composite characteristics, proper frequency shift is employed. In other words, the characteristic of filter 41 at 1.3 kHz. may be added to that of filter 49 at 10.9 kHz. Filter 50 should be the same as filter 49 in any case.

With all the filters designed for best response, and with the fixed equalizer, there still remains some amplitude and delay variation due to the line variation within the 1300 Hz. to 2100 Hz. band. The maximum amplitude and envelope delay variations expected for dial-up lines encounterd in practice are about 4 db and 300 microseconds, respectively. Experiments have been made with various amplitude and delay distortions. For amplitude distortion alone, the modem successfully operated with amplitude roll-off or rise of 5 db within the 800 Hz. bandwidth. And for envelope delay distortion alone, the modem operated satisfactorily with the delay variation of up to 400 microseconds. With such test results, the modem is expected to operate efficiently with minimum error rates over most of the common telephone lines.

This modem, which does not use up the full bandwidth of phone lines, leaves enough frequency bandwidth to permit a few high and/or low frequency channels of Teletype equipment on the same line. Also, by using an 1100 Hz. low pass filter, one can carry on a conversation while the modem is transmitting data on the same line.

While it would be possible to use a 16-phase operation and further reduce the required bandwidth, grouping four 2400 bits per second of data requires a modulation period of 1667 micro-seconds and a bandwidth of 600 Hz. Thus, the amount of bandwidth saved is not great, and the phase threshold is reduced to 11.25 degrees and the system is more susceptible to noise and the theoretical frequency translation limit now becomes only 18.75 Hz.

If the bit rate in question is only 1200 bits per second, 8-phase transmission requires 400 Hz. bandwidth; 4-phase requires 600 Hz. bandwidth; and 2-phase requires 1200 Hz. bandwidth. The 4-phase system usually will be the optimum system because the 600 Hz. band requires no variable equalizers and 4-phase is more noise free than the 8-phase system. Here again, if the proper band limiting is not done, the system will not be dependable over lines of unconditioned voice grade.

In the case of 4-phase, 1200 bits per second, the minimum necessary bandwidth is 600 Hz., as mentioned. Note that it is the minimum necessary bandwidth, but it could be greater. It should not be made too wide since the variations of lines within that bandwidth becomes so great that a variable equalizer would be needed to operate the modem.

The idea in band limiting is to guarantee a minimum necessary bandwidth in good condition which minimum bandwidth is the inverse of the modulation period, and, at the same time, make the bandwidth narrow enough to make all lines essentially the same, thereby eliminating the need for a variable equalizer and achieving a new result of a kind long-sought without success. For conditions as commercially encountered, the 800 Hz. bandwidth is best for 1250 μs. modulation periods, while it may possibly be extended to an upper limit of 1000 Hz. and still provide satisfactory results with a fixed equalizer. A bandwidth of less than 800 Hz. results in loss of information and a bandwidth greater than 1000 Hz. may also result in loss of information due to line distortion.

The 8-phase system discussed here transmits 2400 bits per second data over 800 Hz. bandwidth. For a fixed line application where a line can be equalized well up to 1600 Hz. bandwidth, the same scheme can be used to transmit 4800 bits per second data. The 3 to 1 ratio is fixed for any given bandwidth. For example, for 50 kHz. bandwidth coaxial line, the bit rate may be 150,000 bits per second using 8-phase technique, or 100,000 bits per second with 4-phase scheme.

It will be appreciated that the particular phase modulation and demodulation arrangements disclosed herein are of value and may be used in other data communication systems operating with bandwidths not conforming to the requirement for fortuitously selected lines, and for selected lines of improved characteristics.

While I have described and illustrated a preferred embodiment of my invention, I wish it to be understood that I do not intend to be restricted solely thereto, but that I do intend to cover all modifications thereof which would be apparent to one skilled in the art and which come within the spirit and scope of my invention.

What is claimed is:

1. A data transmission system having a transmitting and receiving device connectable together by a signal transmission link, said system comprising:

means at the transmitting device for generating a carrier signal having a given modulation period and modulated with all of the digital data levels to be transmitted over said link during said modulation period;

means at the transmitting device for applying the data modulated signals to the signal transmission link;

filter means connected in the signal transmission link and characterized as passing signals in the frequency range defined as ±500 Hz. on either side of a center frequency, $f_0$, selected from 1600 Hz. through 1800 Hz., the filter means characterized as having a passband width of $1/T$ Hz. and having a center frequency of $f_0$ where:

T is the modulation period, $f_0$ is the carrier signal frequency, and

Hz. is cycles per second;

said passband width yielding signals at the receiving device which exhibit data integrity only at substantially the center portion of each modulation period; and demodulating means at the receiving device operative to sample each modulation period during the center portion thereof for restoring the digital data levels from the modulated signals received over said transmission link.

2. A data transmission system in accordance with claim 1 wherein the modulating means includes:

means for establishing predetermined phase differences in the data modulated carrier signal for combined data combinations of all digital levels to be transmitted in each successive modulation period wherein:

said demodulating means includes means for sampling the phase angle of adjacent data modulated carrier signals during the center portion only of each modulation period; and means for comparing such phase angles to restore the transmitted digital data levels to their original format.

3. A data transmission system in accordance with claim 1 wherein:

said filter means is connected in said signal transmission link at said transmitter.

4. A data transmission system in accordance with claim 1 wherein:

said filter means is connected in said digital transmission link at said receiver.

5. A data transmission system in accordance with claim 1 wherein:

said filter means is characterized as having a substantially linear phase within said passband width.

6. A data transmission system in accordance with claim 1 wherein:

said transmission link exhibits amplitude and delay characteristics and wherein:

said filter means and said transmission link form a composite filter network having substantially a linear phase and a constant amplitude characteristic over said passband width of said filter means.

7. A data transmission system in accordance with claim 6 wherein:

said transmission link is formed by a telephone line randomly selected from among a plurality of telephone lines each having signal transmission characteristics which vary widely from each other over their respective bandwidth and each of which have substantially matched amplitude and delay characteristics over a selected narrow bandwidth.

8. A data transmission system in accordance with claim 7 wherein:

all of the telephone lines exhibit, for said narrow bandwidth of said filter means, an average line characteristic of amplitude and delay distortion compensatable by a fixed filter; and wherein said system further comprises fixed equalization means connected in the signal transmission path of said system; and including fixed amplitude and fixed delay correction networks selected to equalize said system for the average line characteristic within said narrow bandwidth.

9. A data transmission system in accordance with claim 8 wherein:

said selected telephone line, said fixed equalization means, and said filter means form a composite network having substantially a linear phase and constant amplitude over said bandwidth of said filter means.

10. A data transmission system in accordance with claim 1 and further characterized as receiving through said filter means a carrier envelope having a $1/T$ signal component synchronized relative to the data containing portions of said band-limited envelope, and further comprising:

a clock circuit for a data receiver at the transmission link;

said clock circuit comprising means for isolating said signal component from said carrier; and a clock generator slaved by said output signal component from said isolating means.

11. A data transmission system in accordance with claim 10 wherein said clock circuit isolating means comprises:

an additional filter means having a passband for passing only said $1/T$ signal component from said carrier.

12. A data transmission system in accordance with claim 11 wherein said clock generator comprises:

a controllable self-oscillating tuned circuit tuned at $1/T$ and controllable in response to the output signal passed by said additional filter means.

13. A data transmission system in accordance with claim 10 wherein:

said digital data levels are represented for transmission over said link as an analog signal having a peaked amplitude substantially at the center of each modulation period; and said modulating means comprises:

an angle modulator for establishing predetermined phase differences in said data-modulated carrier signal for assigned data combinations in successive modulation periods;

and said system further comprises at said receiving device:

a differential phase demodulator connected to receive said data modulated carrier signal and said clock signal for restoring said transmitted digital data levels to their original format.

14. A data transmission system in accordance with claim 13 wherein said demodulator at said receive comprises a phase-shift demodulator having:

means for producing a pair of said data modulated carrier signals of which one has been delayed a time interval corresponding to the modulation period of the signal to produce a reference signal;

means for delaying said reference signal serially and in stepped amounts to produce a predetermined number of subreference signals;

means for multiplying each subreference signal, respectively, with the undelayed signal of said pair of signals, to produce product signals which have signs corresponding to the magnitude of the relative phase angle between each subreference signal and the said undelayed signal of said pair, there being produced a signal of one polarity if the magnitude of the relative angle is less than 90° and a sign of opposite polarity when the magnitude of relative angle is greater than 90°; and means for detecting and decoding the signs of said product signals.

15. A data transmission system in accordance with claim 14 comprising:

means controlling the output from said multiplying means in accordance with said clock signal.

16. A data transmission system in accordance with claim 15 wherein:

said clock circuit comprises additional means for deriving a further clock signal having a rate corresponding to the bit rate of data transmitted; and output means controlled by said further clock signal to deliver data at the input bit rate.

17. A data transmission system in accordance with claim 16 wherein:

said output means includes a set of storage elements corresponding in number to the number of phases of said differential phase shifted signal, each such storage element having stored therein a binary bit pattern in accordance with a selected schedule of binary bit patterns, there being one such bit pattern delivered to the output at a time in each case and in accordance with the phase angle between successive phases of said differential phase shifted signal.

18. A data transmission system in accordance with claim 17 wherein said means for detecting and decoding includes:

a plurality of AND gate circuits corresponding in number to the number of phases of said differential phase shifted signal;

means for supplying the positive and negative signals to said AND circuits, including means for changing the signs of certain of said signals in accordance with a selected code, whereby one, and only one, of said AND circuits will have like polarity on all of its input lines;

a set of storage elements corresponding in number to the number of phases in said differential phase shifted signal, each such storage element having stored therein a binary bit pattern in accordance with a selected schedule of binary bit patterns;

a source of clock signals having a rate corresponding to the input data bit rate; and means controlled by said AND circuits for passing said clock signals to a storage element selected by said AND circuits.

19. A data transmission system having a transmitting and receiving device connectable together by a signal transmission link, said system comprising:

means for storing a group of at least three serial bits inputted to said transmitting device at a given data bit rate;

means at the transmitting device for generating a carrier signal having a given modulation period and modulated with all of the digital bits of said group to be transmitted over said link during said modulation period;

means at the transmitting device for applying the data modulated signals to the signal transmission link;

means at the receiving device operative for sampling each modulation period at substantially the center thereof and responsive thereto for demodulating the data modulated signals received over said link; and filter means connected in the signal transmission link between said modulating and demodulating means, the filter means being characterized as having a passband width of about $1/T$ $H_z$. and having a center frequency of $f_0$ selected between 1600 $H_z$. and 1800 $H_z$. and a passband substantially equal to ⅓ the data bit rate; where:

T is the modulation period, $f_0$ is the carrier signal frequency, and $H_z$. is cycles per second.

20. A data transmission system in accordance with claim 19 wherein the modulating means includes:

means for establishing predetermined phase differences selected in 45 degree multiples in the data modulated carrier signal for each data combination of digital bit groups to be transmitted in each successive modulation period wherein:

said demodulating means includes means for sampling the phase angle of adjacent data modulated carrier signals during the center portion of each modulation period; and means for comparing such phase angles to restore the transmitted digital data levels to their original format.

21. A data transmission system in accordance with claim 20 wherein:

said transmission link exhibits amplitude and delay characteristics and wherein:

said filter means and said transmission link form a composite filter network having substantially a linear phase and a constant amplitude characteristic over said passband width of said filter means.

22. A data transmission system in accordance with claim 21 wherein:

said transmission link is formed by a telephone line randomly selected from among a plurality of telephone lines each having signal transmission characteristics which vary widely from each other over their respective bandwidth and each of which have substantially matched amplitude and delay characteristics over a selected narrow bandwidth.

23. A data transmission system in accordance with claim 22 wherein:

all of the telephone lines exhibit, for said narrow bandwidth of said filter means, an average line characteristic of amplitude and delay distortion compensatable by a fixed filter; and wherein said system further comprises fixed equalization means connected in the signal transmission path of said system; and including fixed amplitude and fixed delay correction networks selected to equalize said system for the average line characteristic within said narrow bandwidth.

24. A data transmission system in accordance with claim 22 and further comprising:

means for transmitting voice or signals over the signal transmission link simultaneously with said data modulated carrier signal including:

at least one additional means band limiting said voice signals to a frequency range exclusive of said narrow passband width of said filter means.

25. A data transmission system having a transmitting and receiving device connectable together by a signal transmission link, said system comprising:

means at the transmitting device for generating a carrier signal having a given modulation period modulated with all of the digital data levels to be transmitted over said link during said modulation period, with each modulation period including predetermined phase differences representing digital levels thereof;

means at the transmitting device for applying the data modulated signals to the signal transmission link;

means at the receiving device for demodulating the data modulated signals received over said link, said demodulating means including means for sampling the phase angle of adjacent data modulated carrier signals during the center portion of each modulation period; and filter means connected in the signal transmission link between said modulating and demodulating means, the filter means being characterized as having a passband width of about 1/T Hz. and having a center frequency of $f_0$; where:

T is the modulation period, $f_0$ is the carrier signal frequency, and

Hz. is cycles per second.

26. A data transmission system in accordance with claim 25 and further comprising:

means for transmitting voice signals over the same signal transmission link as said data modulated carrier signal in frequency ranges exclusive of said narrow passband width of said filter means.

27. A data transmission system in accordance with claim 25 wherein:

said filter means is connected in said signal transmission link at said transmitter.

28. A data transmission system in accordance with claim 25 wherein:

said filter means is connected in said digital transmission link at said receiver.

29. A data transmission system in accordance with claim 25 wherein:

said filter means is characterized as having a substantially linear phase within said passband width.

30. A data transmission system in accordance with claim 29 wherein:

said linear phase has a bandwidth of about 800 Hz. and a center frequency of about 1700 Hz.

31. A data transmission system in accordance with claim 25 wherein:

said transmission link exhibits amplitude and delay characteristics and wherein:

said filter means and said transmission link form a composite filter network having substantially a linear phase and a constant amplitude characteristic over said passband width of said filter means.

32. A data transmission system in accordance with claim 31 wherein:
said transmission link is formed by a telephone line randomly selected from among a plurality of telephone lines each having signal transmission characteristics which vary widely from each other over their respective bandwidth and each of which have substantially matched amplitude and delay characteristics over a selected narrow bandwidth.

33. A data transmission system in accordance with claim 32 wherein:
all of the telephone lines exhibit, for said narrow bandwidth of said filter means, an average line characteristic of amplitude and delay distortion compensatable by a fixed filter; and
wherein said system further comprises fixed equalization means connected in the signal transmission path of said system; and
including fixed amplitude and fixed delay correction networks selected to equalize said system for the average line characteristic.

34. A data transmission system in accordance with claim 33 wherein:
said selected telephone line, said fixed equalization means, and said filter means form a composite network having substantially a linear phase and constant amplitude over said bandwidth of said filter means.

35. A data transmission system in accordance with claim 25 and further comprising:
means for transmitting teletype signals over the same signal transmission link as said data modulated carrier signal in frequency ranges exclusive of said narrow passband width of said filter means.

36. A data transmission system in accordance with claim 25 and further characterized as receiving through said band-limiting filter means a carrier envelope having a $1/T$ signal component synchronized relative to the data containing portions of said band-limited envelope, and further comprising:
a clock circuit for a data receiver at the transmission link;
said clock circuit comprising means for isolating said signal component from said carrier; and
a clock generator slaved by said output signal component from said isolating means.

37. A data transmission system in accordance with claim 36 wherein said clock circuit isolating means comprises:
an additional filter means having a passband for passing only said $1/T$ signal component from said carrier .

38. A data transmission system in accordance with claim 37 wherein said clock generator comprises:
a controllable self-oscillating tuned circuit tuned at $1/T$ and controllable in response to the output signal passed by said additional filter means.

39. A method of transmitting digital data over a data transmission system having transmitting and receiving devices connectable together in a signal transmission path, comprising the steps of:

establishing a transmission path for said transmitting device by allowing random selection of at least one telephone line from among a plurality of telephone lines each having signal transmission characteristics which vary widely from each other over their respective bandwidths and each of which have essentially matched amplitude and delay characteristics over a selected narrow bandwidth available at all of said telephone lines;
emitting at said transmitting device a carrier frequency having a predetermined modulation period;
modulating said carrier frequency with all digital data levels to be transmitted during said modulation period; and
band limiting the modulated carrier signal for transmission over the randomly selected telephone line in accordance with a passband equation defined as $1/T$ Hz. with a center frequency of $f_0$, selected between 1600 Hz. and 1800 Hz. and a bandwidth defined to pass signals only between $\pm 500$ Hz. on either side of the center frequency, where:
T is the modulation period,
$f_0$ is the carrier frequency, and
Hz. is cycles per second; and
sampling only the center portion of each modulation period of signals received over said link to demodulate said digital data.

40. A data transmission method in accordance with claim 39 wherein all of the telephone lines exhibit, for said narrow bandwidth, an average line characteristic of amplitude and delay distortion, and wherein said band limiting step introduces additional amplitude and/or delay distortion in rejecting signal components in said data modulated carrier outside of said passband width defined by said passband equation:
the additional step of equalizing signals in the signal transmission path of said system by introducing amplitude and delay factors inverse to a composite of the average line characteristic and the additional amplitude and/or delay distortion introduced by said band limiting.

UNITED STATES PATENTS

References Cited

| | | | |
|---|---|---|---|
| 3,011,135 | 11/1961 | Stump et al. | 333—18 X |
| 3,023,269 | 2/1962 | Maniere et al. | 178—67 X |
| 3,128,343 | 4/1964 | Baker | 178—67 |
| 3,263,185 | 7/1966 | Lender. | |

OTHER REFERENCES

Irland: "A High-Speed Data Signaling System," Bell Laboratories Record, October 1958, pp. 376–380.

ROBERT L. GRIFFIN, Primary Examiner

W. S. FROMMER, Assistant Examiner

U.S. Cl. X.R.

178—66, 67; 325—30, 42; 333—18